US009991801B2

(12) United States Patent
Wang et al.

(10) Patent No.: US 9,991,801 B2
(45) Date of Patent: Jun. 5, 2018

(54) HYBRID HYSTERETIC CONTROL FOR LLC CONVERTER

(71) Applicant: Texas Instruments Incorporated, Dallas, TX (US)

(72) Inventors: Fan Wang, Plano, TX (US); Timothy B. Merkin, Richardson, TX (US); Brent A. McDonald, Murphy, TX (US); Joseph Michael Leisten, Cork (IE)

(73) Assignee: Texas Instruments Incorporated, Dallas, TX (US)

( * ) Notice: Subject to any disclaimer, the term of this patent is extended or adjusted under 35 U.S.C. 154(b) by 0 days. days.

(21) Appl. No.: 15/233,736

(22) Filed: Aug. 10, 2016

(65) Prior Publication Data
US 2018/0048236 A1    Feb. 15, 2018

(51) Int. Cl.
*H02M 3/335* (2006.01)
*H02M 1/08* (2006.01)
*H02M 1/00* (2006.01)

(52) U.S. Cl.
CPC .......... *H02M 3/33507* (2013.01); *H02M 1/08* (2013.01); *H02M 2001/0009* (2013.01)

(58) Field of Classification Search
CPC ........................................... H02M 3/335–3/44
See application file for complete search history.

(56) References Cited

U.S. PATENT DOCUMENTS

| 7,262,562 B2* | 8/2007 | Bai ..................... H05B 41/2828 315/247 |
| 8,842,449 B1 | 9/2014 | Tong |
| 2014/0376270 A1 | 12/2014 | Kern et al. |
| 2015/0124492 A1 | 5/2015 | Fu et al. |
| 2015/0256088 A1* | 9/2015 | Ohtake ................... H02M 1/36 363/21.02 |

FOREIGN PATENT DOCUMENTS

JP    2016100989 A    5/2016

OTHER PUBLICATIONS

"TEA19161T, Digital controller for high-efficiency resonant power supply," Product data sheet, Rev. 1, Mar. 10, 2016 (46 pages).
Search Report for PCT/US17/46371, dated Nov. 16, 2017 (1 page).

* cited by examiner

*Primary Examiner* — Gary L Laxton
*Assistant Examiner* — Peter Novak
(74) *Attorney, Agent, or Firm* — William B. Kempler; Charles A. Brill; Frank D. Cimino (57) ABSTRACT

An LLC converter includes an input having a first node and a second node. A first switch is coupled between the first node and a third node and a second switch is coupled between the third node and the second node. A transformer having a first transformer input is coupled to the third node. A resonant capacitor is coupled to a second transformer input and a first input of a summer. A voltage ramp generator is coupled to a second input of the summer, the summer for summing voltages at the first input and the second input. The converter further includes circuitry for generating control signals for the first switch and the second switch in response to the output of the summer.

19 Claims, 7 Drawing Sheets

HYBRID HYSTERETIC CONTROL FOR LLC CONVERTER

BACKGROUND

LLC converters are a form of resonant converters. Resonant converters provide smooth waveforms, high efficiency, and high power density. Resonant converters are switching converters that include a tank circuit actively participating in determining input-to-output power flow. There are many types of resonant converters and most, if not all, resonant converters are based on a resonant inverter such as a system that converts a DC voltage into a sinusoidal voltage and provides power to a load. The sinusoidal voltage is typically a low harmonic content AC voltage. Generation of the sinusoidal voltage is achieved by a switch network that produces a square-wave voltage that is applied to a resonant tank circuit tuned to the fundamental component of the square wave. In this way, the tank responds primarily to the fundamental component and negligibly to the higher order harmonics, so that its voltage and/or current, are essentially sinusoidal.

LLC converters have been widely used in more and more applications for their ability to achieve high efficiency with soft switching. Direct frequency control is usually used for LLC converters, wherein a voltage loop compensator directly controls the switching frequency of the LLC converter. A small-signal transfer function of direct frequency controlled LLC converters varies with input voltage and load current. The transfer function changes between a $1^{st}$ order system and a $2^{nd}$ order system in different operating conditions, making the voltage loop compensator design very challenging and achieving very limited loop bandwidth. Another disadvantage of direct frequency control is that the line transient is poor because there is no direct control of the relationship between input current and output voltage

SUMMARY

An LLC converter includes an input having a first node and a second node. A first switch is coupled between the first node and a third node and a second switch is coupled between the third node and the second node. A transformer having a first transformer input is coupled to the third node. A resonant capacitor is coupled to a second transformer input and a first input of a summer. A voltage ramp generator is coupled to a second input of the summer, the summer for summing voltages at the first input and the second input. The converter further includes circuitry for generating control signals for the first switch and the second switch in response to the output of the summer.

DETAILED DESCRIPTION

Example embodiments are described with reference to the drawings, wherein like reference numerals are used to designate similar or equivalent elements. Illustrated ordering of acts or events should not be considered as limiting, as some acts or events may occur in different order and/or concurrently with other acts or events. Furthermore, some illustrated acts or events may not be required to implement a methodology in accordance with this disclosure.

Figure 1:
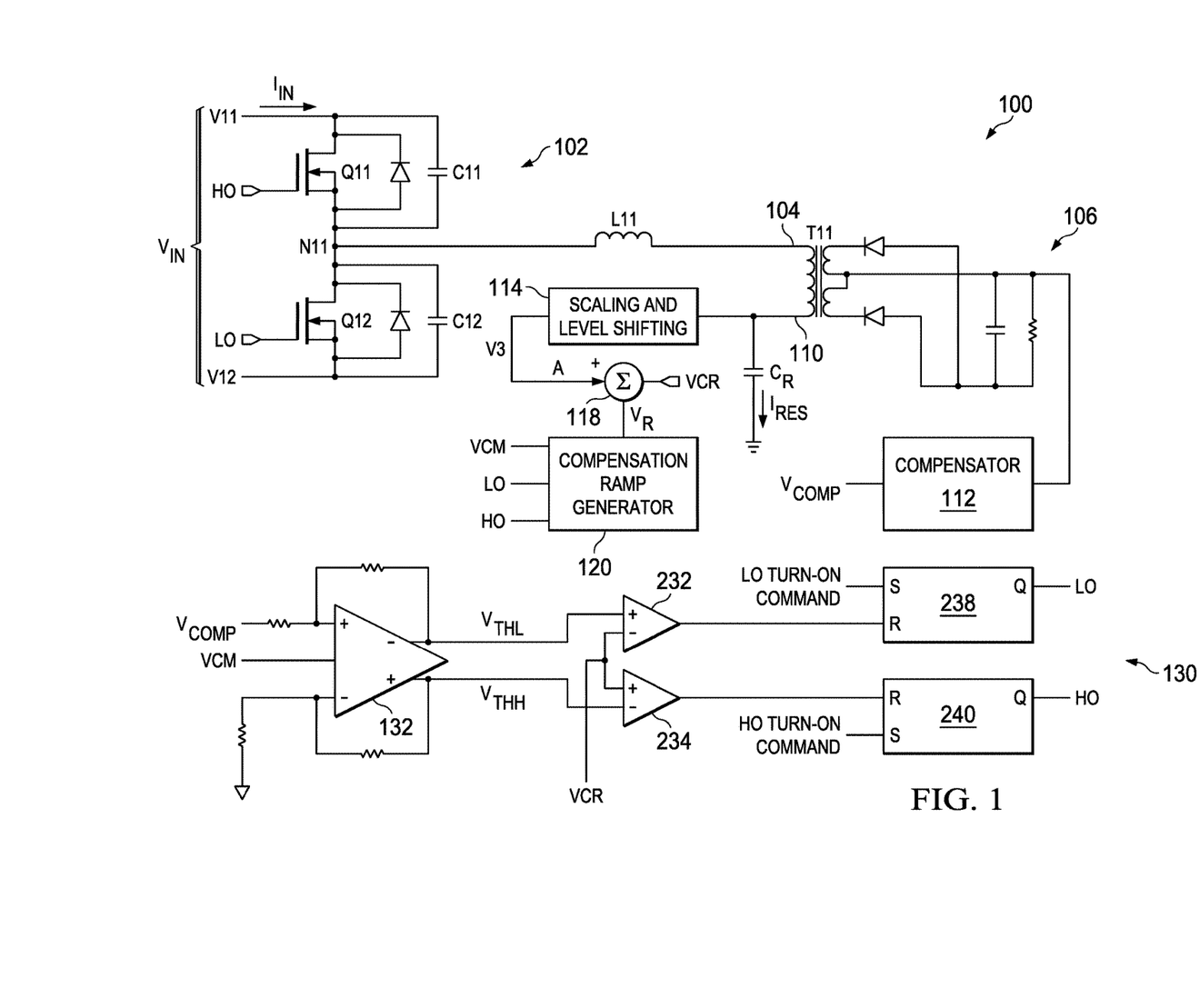
FIG. 1 is a schematic diagram of an example LLC converter.

FIG. 1 is a schematic diagram of an example LLC converter 100. The converter 100 is a low cost and robust circuit implementation of a hybrid hysteretic control method that is suitable for both primary side and secondary side control applications. The converter 100 includes a primary side switching circuit 102 coupled to a first primary node 104 of a transformer T11 by way of an inductor L11. The primary side switching circuit 102 includes a high switch and a low switch coupled between a first voltage V11 and a second voltage V12 (sometimes referred to herein as coupled to first and second nodes). The difference between the voltages V11 and V12 is the input voltage $V_{IN}$ of the converter 100. The current entering the LLC by way of the voltage V11 is the input current $I_{IN}$ of the converter 100. In the example of FIG. 1, the switches are transistors Q11 and Q12, respectively, coupled at a node N11 (sometimes referred to herein as a third node). The gate of transistor Q11 is coupled to a high control voltage HO and the gate of transistor Q12 is coupled to a low control voltage LO that are described in detail below. The high and low control voltages HO and LO turn transistors Q11 and Q12 on and off and are sometimes referred to as command signals.

The secondary side of transformer T11 is coupled to a rectifier 106. The output of the rectifier 106 is coupled a compensator 112 that generates a voltage $V_{COMP}$, which is used in the generation of the high control voltage HO and the low control voltage LO. Accordingly, the voltage $V_{COMP}$ provides feedback for the converter 100.

A second primary node 110 of transformer T11 is coupled to a resonant capacitor $C_R$ and scaling and level shifting circuitry 114. The voltage at the second primary node 110 resulting from the resonant capacitor $C_R$ is divided down and level shifted by the scaling and level shifting circuitry 114 and is referred to as the voltage V3. The voltage V3 is input to a summer 118 that sums the voltage V3 with a frequency compensation ramp voltage VR to generate a voltage VCR. The voltage VCR is used in the generation of the high control voltage HO and the low control voltage LO. It is noted that different variations of the LLC 100 may be implemented with the circuitry for generating the voltages and control voltages described herein. For example, in some embodiments, the inductor L11 is not present.

Figure 2:
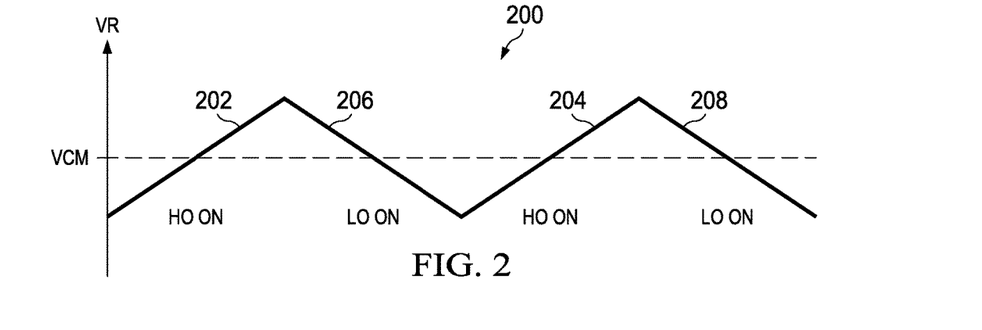
FIG. 2 is a graph 200 showing an example of the frequency compensation ramp voltage.

FIG. 2 is a graph 200 showing an example of the frequency compensation ramp voltage VR, which is generated by a compensation ramp generator 120. The voltage VR is a triangular wave with constant slope and is synchronized with the high control voltage HO and the low control voltage LO. When the high control voltage HO is high, the slope of the voltage VR is positive as shown by segments 202 and 204, and transistor Q11 is on or conducting. When the low control voltage LO is high, the slope of the voltage VR is negative as shown by segments 206 and 208, and transistor Q12 is on. When both the high control voltage HO and the low control voltage LO are low, the slope of the voltage VR is zero, meaning the voltage VR is not changing. The voltage VR has the same common mode voltage VCM as the voltage V3 generated by the scaling and level shifting circuitry 114. The compensation ramp generator 120 receives inputs of the common mode voltage VCM, the high control voltage HO, and the low control voltage LO to generate the triangular waveform of the voltage VR centered about the common mode voltage VCM.

The two voltages V3 and VR are added together to generate the voltage VCR. If the frequency compensation ramp of the voltage VR dominates, the voltage VCR will be a substantially triangular waveform and the generation of the high control voltage HO and the low control voltage LO will be similar to direct frequency control. If the voltage V3 dominates, the voltage VCR will be substantially like the voltage V3 and the generation of the high control voltage HO and the low control voltage LO will be similar to charge control.

The voltages VCR and $V_{COMP}$ are coupled to a control voltage generator 130 that generates the high control voltage HO and the low control voltage LO. The compensation voltage $V_{COMP}$ and the common mode voltage VCM are input to an amplifier 132 for generation of a low threshold voltage $V_{THL}$ and a high threshold voltage $V_{THH}$. The threshold voltages $V_{THL}$ and $V_{THH}$ are compared to the voltage VCR for generation of the high and low control voltages HO and LO by way of comparators 232 and 234. More specifically, the high and low control voltages HO and LO are generated when the threshold voltages $V_{THL}$ and $V_{THH}$ are higher or lower than the voltage VCR. The outputs of the comparators 232 and 234 are the reset inputs to flip-flops 238 and 240. The set inputs of the flip-flops 238 and 240 are LO and HO turn-on commands from dead time control circuits. Dead time control circuits generate either a fixed dead time or adaptive dead time and are known in the art. In a fixed dead time, the HO turn-on command is delayed for a period after the LO turn-on command is turned off. The LO turn-on command is delayed for a period after the HO turn-on command is turned off. In adaptive dead time, the HO turn-on command is turned on when the voltage at node N11 has completed slew from low to high and the LO turn-on command is turned on when the voltage at node N11 has completed slew from high to low.

Figure 3:
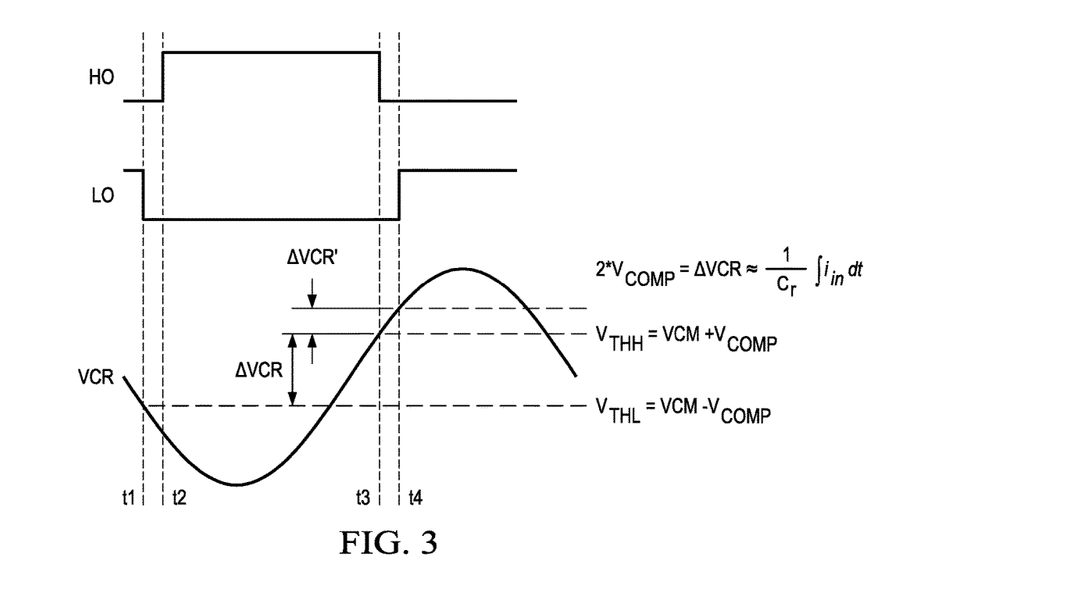
FIG. 3 is examples of the control voltages and the voltage VCR.

FIG. 3 is examples of the control voltages HO and LO and the voltage VCR. Based on the voltages $V_{COMP}$ and V3 the two threshold voltages $V_{THH}$ and $V_{THL}$ are generated wherein $V_{THH}=VCM+V_{COMP}$ and $V_{THL}=VCM-V_{COMP}$. In summary, the voltage VCR is compared with the two threshold voltages $V_{THH}$ and $V_{THL}$. When the voltage VCR is greater than the high threshold voltage $V_{TTH}$, transistor Q11 is turned off and when the voltage VCR is less than the low threshold voltage $V_{TBL}$, transistor Q12 is turned off. FIG. 3 shows the high command voltage HO and the low command voltage LO that drive the gates of transistors Q11 and Q12. FIG. 3 also shows and example of the voltage VCR. The timing for the high and low control voltages HO and LO is controlled by comparing the voltage VCR with the threshold voltages $V_{THH}$ and $V_{THL}$. The turn-on times for the high and low control voltages HO and LO are controlled by either fixed or adaptive dead time control circuit.

The voltage across the resonant capacitor $C_R$ is the integral of the resonant current $I_{RES}$ that flows through the resonant capacitor $C_R$. The resonant current $I_{RES}$ is related to the voltage VCR by equation (1) as follows:

$$k \times (\Delta VCR + \Delta VCR') = \frac{1}{C_r} \int_{t1}^{t4} I_{RES} dt \qquad \text{Equation (1)}$$

where: $\Delta VCR$ is the VCR voltage difference between LO turn-off (time t1) and HO turn-off (t3); $\Delta VCR'$ is the VCR voltage difference during dead time (between t3 and t4); k is the VCR scaling factor (ratio between the resonant capacitor voltage and the voltage VCR); $C_R$ is the resonant capacitance value. It follows that $k \times (\Delta VCR+\Delta VCR')$ is the actual voltage change on the resonant capacitor $C_R$ from time t1 to time t4.

Equation (1) may be used to relate the voltage $V_{COMP}$ the input current $I_{IN}$ of the LLC 100. The following relationship and equations are based on the assumptions that during dead time, the current flowing through the two drain to source capacitance C11 and C12, FIG. 1, are equal and in opposite direction. Accordingly, $I_{RES}$ equal to twice the input current $I_{IN}$ during dead time. Through some iterations, steady-state operation is attained and equation (1) yields equation (2) as follows:

$$k \times (\Delta VCR + \Delta VCR') = \frac{1}{C_r} \int_{t1}^{t4} I_{IN} dt \qquad \text{Equation (2)}$$

Equation (2) can be written to be a function of $V_{COMP}$ as shown by equation (3) as follows:

$$2 \times V_{COMP} = V_{THH} - V_{THL} = \Delta VCR + \Delta Ramp = \qquad \text{Equation (3)}$$
$$\frac{1}{k} \times \frac{1}{C_R} \int_{t1}^{t4} I_{IN} dt - \frac{1}{k} \times \Delta VCR' + \Delta Ramp$$

Equation (3) is simplified to yield equation (4) as follows:

$$2 \times V_{COMP} = \frac{1}{k} \times \frac{1}{C_R} \times I_{INAVG} \times T - \qquad \text{Equation (4)}$$
$$\frac{1}{k} \times \Delta VCR' + Iramp \times \frac{T}{2} \times \frac{1}{C_{11} \| C_{12}}$$

where $I_{INAVG}$ is the average input current and T is the switching period. As noted by equation (4), if the resonant capacitor voltage change during dead time is ignored and the current $I_{RAMP}$ is very small, then the voltage $V_{COMP}$ is linearly related to the average input current $I_{INAVG}$ multiplied by the switching period, which is the input charge of one cycle of the converter 100. The compensation ramp (voltage VR) helps with transient response relative to charge control. More specifically, the best transient response is achieved when the voltage $V_{COMP}$ is proportional to the current $I_{INAVG}$. In a closed loop system, a step load increase is applied. Based on the gain vs. frequency relationship of the LLC converter, the switching period T will become larger. From Equation (4), if the current $I_{RAMP}$ is equal to zero, $V_{COMP}$ is proportional to $I_{INAVG}$ multiplied by the period T. If proper current $I_{RAMP}$ is added, $V_{COMP}$ can be adjusted to approximately proportional to $I_{INAVG}$. The result is better transient response.

Figure 4:
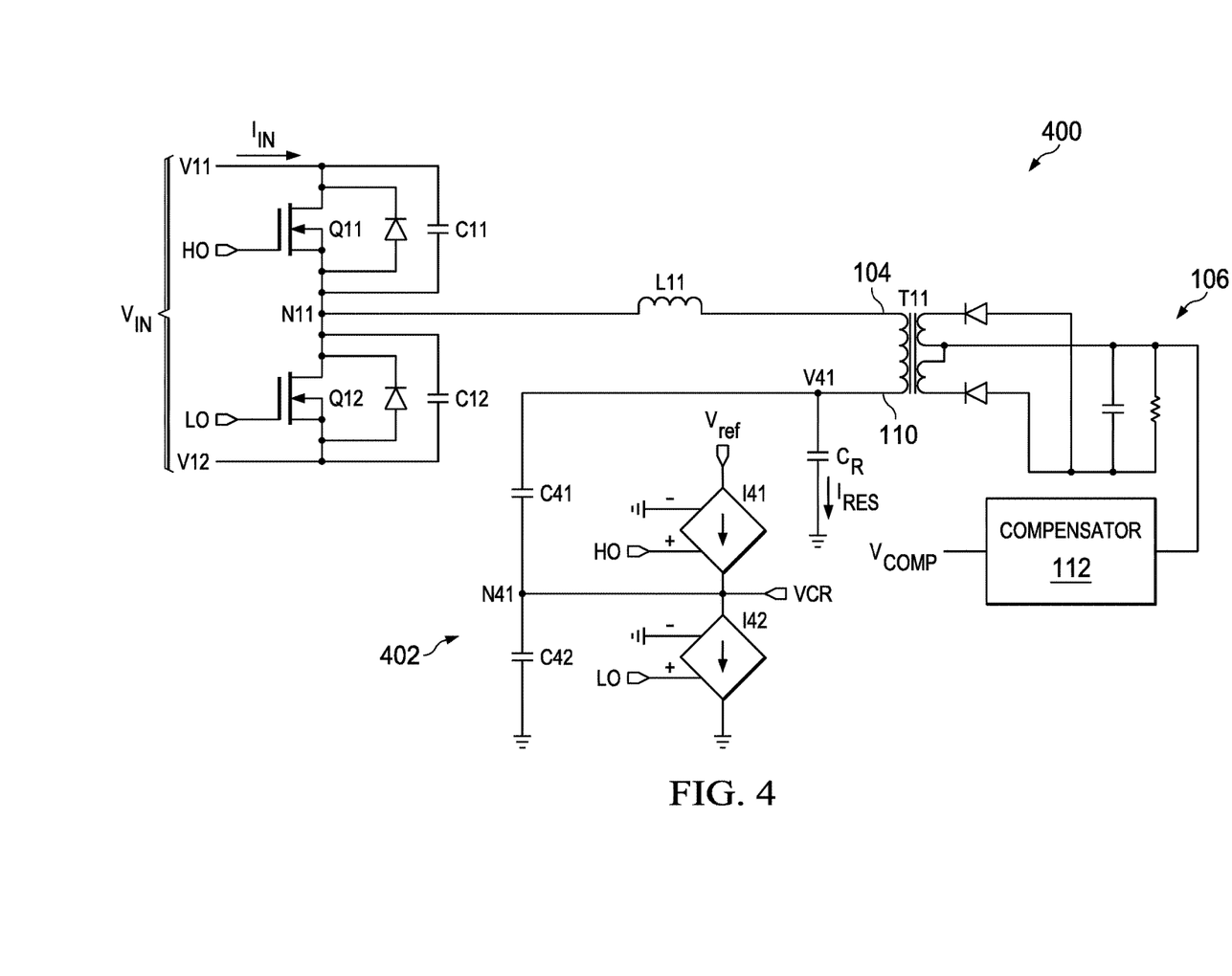
FIG. 4 is a schematic diagram of an LLC converter having a capacitive divider.

FIG. 4 is a schematic diagram of an LLC converter 400 having a capacitive divider 402. The capacitive divider 402 and other components of the converter 400 coupled to the capacitive divider 402 generate the voltage VCR, which is processed as described above to generate the high control voltage HO and the low control voltage LO. The capacitive divider 402 and the components coupled thereto constitute the scaling and level shifting circuitry 114 and the summer 118 of FIG. 1. A voltage V41 at the second primary node 110 is the result of the resonant capacitor $C_R$ and is divided down by capacitors C41 and C42 that constitute the capacitive divider 402. The output of the capacitive divider 402 is a node N41 where the voltage VCR is present.

The converter 400 includes two matched current sources I41 and I42 that are coupled to node N41. The current source I41 is controlled by the high control voltage HO and the current source I42 is controlled by the low control voltage LO. When the high control voltage HO turns on transistor Q11, it also turns on current source I41, which injects a constant current into the capacitive divider 402. When the low control voltage LO turns on transistor Q12, it also turns on current source I42, which pulls the same current from the capacitive divider 402 that was injected into the capacitive divider 402 by current source I41. The injection and extraction of current into and out of the capacitive divider 402 by the current sources I41 and I42 adds a triangular compensation ramp to the voltage VCR. This compensation ramp is the same as or similar to the voltage VR described above. The current sources I41 and I42 are supplied by a reference voltage $V_{REF}$ that, in some examples, is set to be twice of the common mode voltage VCM. In other examples, the reference voltage $V_{REF}$ is at least twice the common mode voltage VCM. In the example if FIG. 4, the triangular compensation ramp is centered about the common mode voltage VCM.

The converter 400 has an inherent negative feedback to keep the high side (transistor Q11) and the low side (transistor Q12) on time balanced, and to keep the voltage VCR centered about the common mode voltage VCM. For example, if a disturbance causes voltage VCR to drop, it will take longer for the voltage VCR to attain the high threshold voltage $V_{TTH}$. In response, the current source I41 will be on longer, and a higher voltage VCR is generated.

Figure 5:
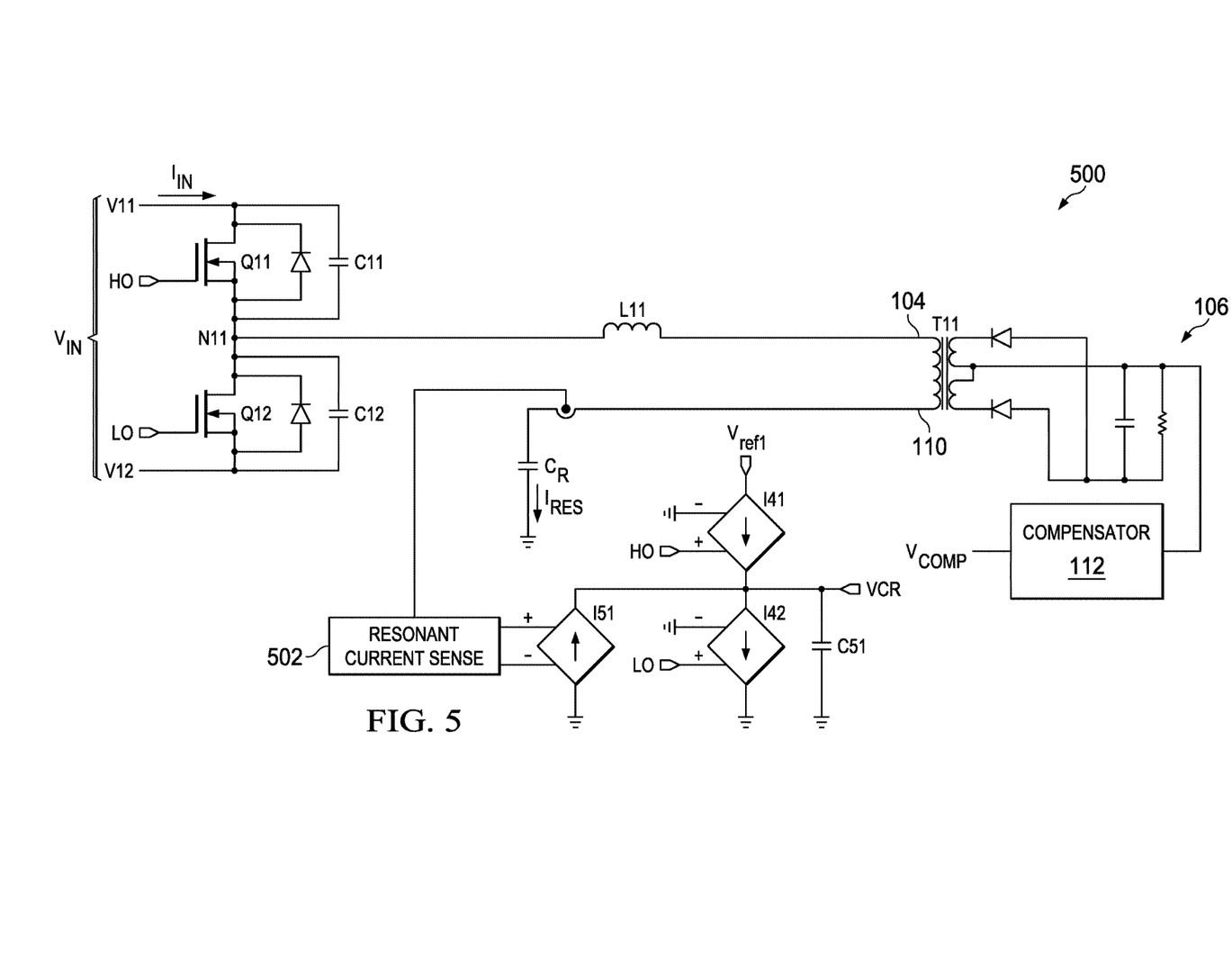
FIG. 5 is a schematic diagram of an LLC converter having a resonant current sensor.

FIG. 5 is a schematic diagram of an LLC converter 500 that has a resonant current sensor 502 that can be used on either the primary side or the secondary side of the transformer. The resonant current $I_{RES}$ in the resonant capacitor $C_R$ is sensed. The sensing may be accomplished by a differentiator on the voltage of the resonant capacitor $C_R$ or a current sense transformer as described below. The voltage across the resonant capacitor $C_R$ is then re-constructed using a controlled current source I51 and a capacitor C51. The current sources I41 and I42 inject and extract current from the capacitor C51 in the same manner as they do with respect to the converter 400 of FIG. 4 to generate the above-described voltage VCR.

Figure 6:
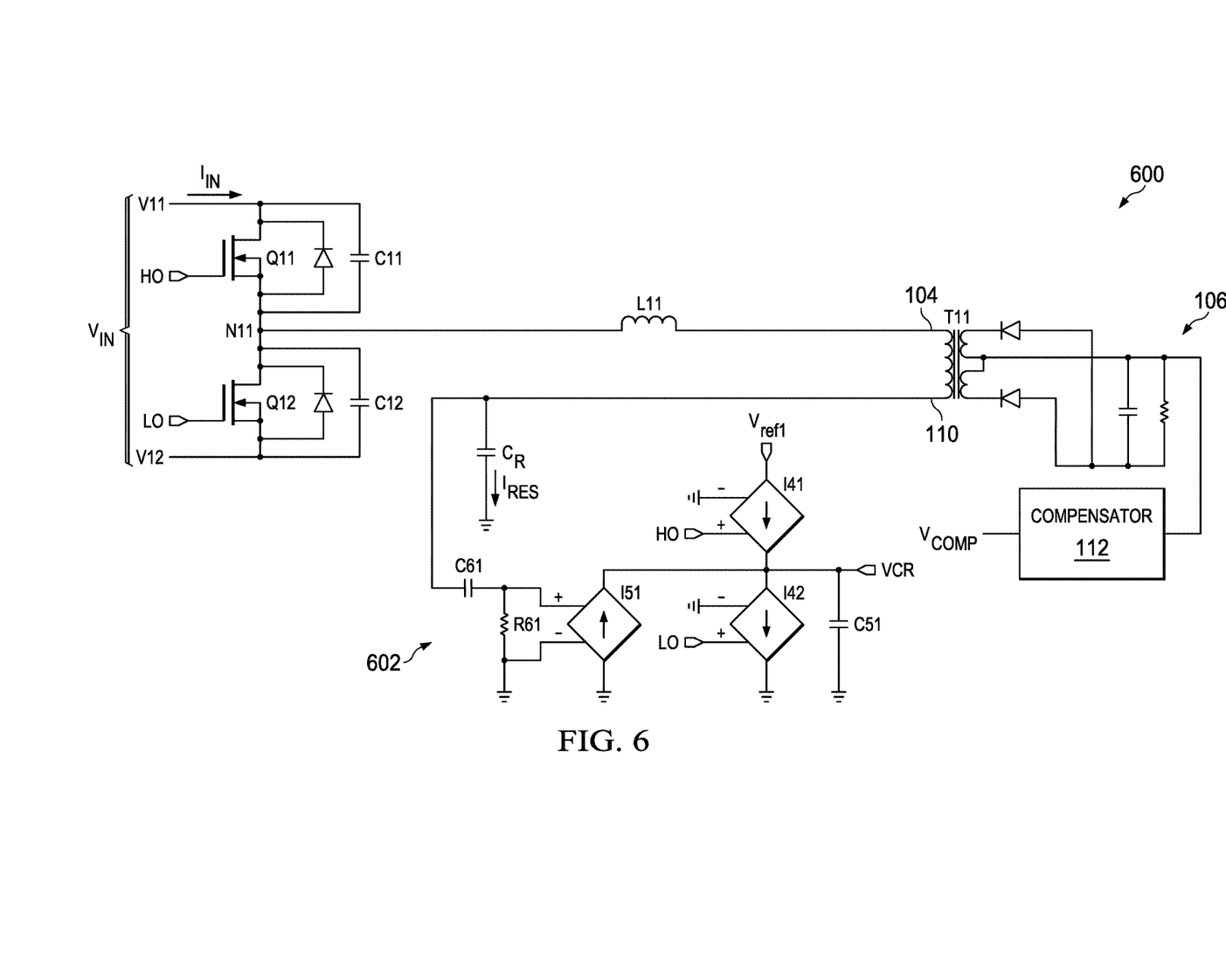
FIG. 6 is a schematic diagram of an LLC converter having a voltage differentiator.

FIG. 6 is a schematic diagram of an LLC converter 600 that has a passive differentiator 602 for sensing the resonant current $I_{RES}$ through the resonant capacitor $C_R$. The differentiator 602 includes a capacitor C61 coupled in series with a resistor R61. The voltage across the resistor operates the current source I51, which charges capacitor C51 as described above.

Figure 7:
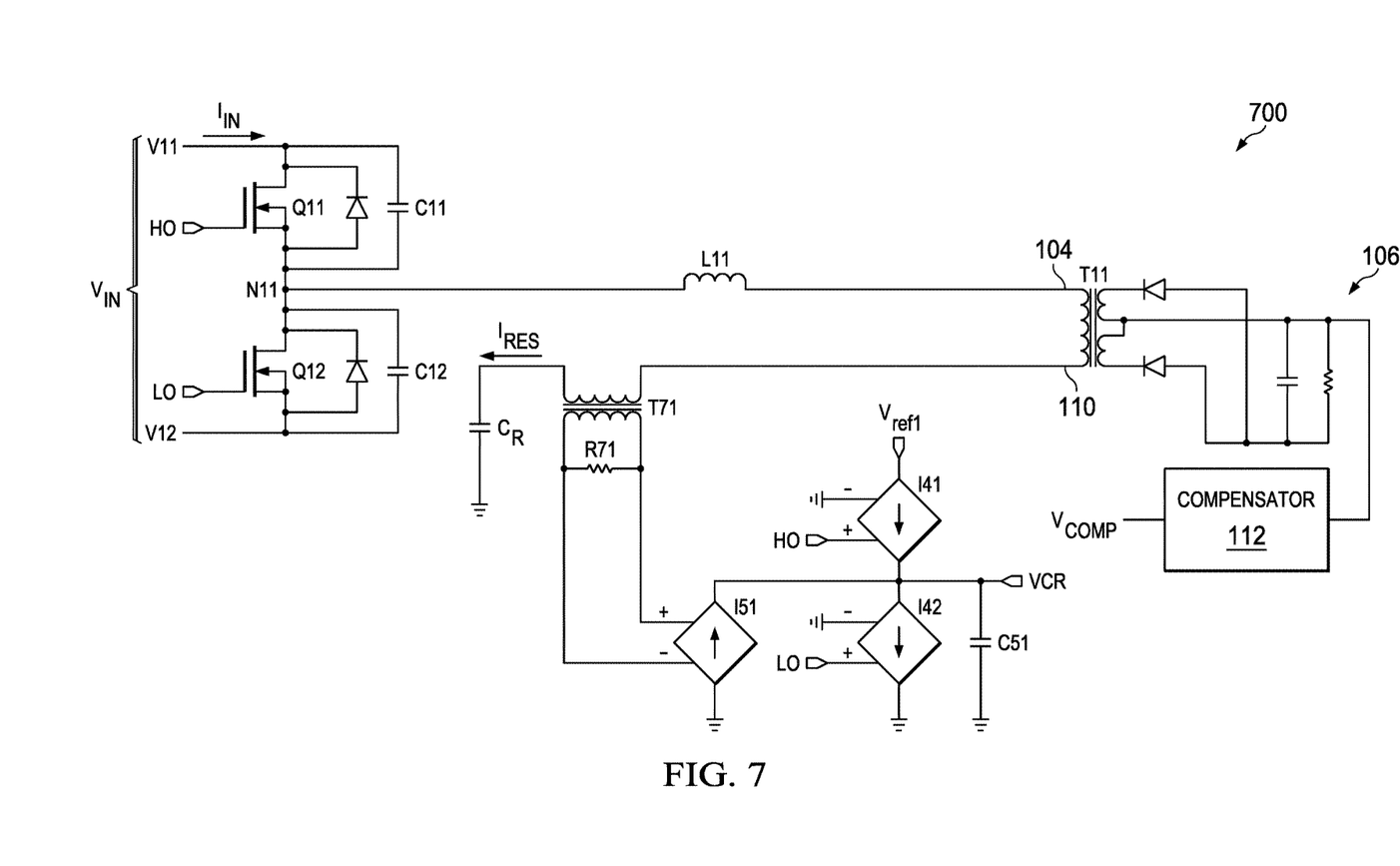
FIG. 7 is a schematic diagram of an LLC converter having a resonant current transformer sensor.

FIG. 7 is a schematic diagram of an LLC converter 700 that has a current sensing transformer T71 for sensing the resonant current $I_{RES}$ through the resonant capacitor $C_R$. The primary side of the transformer T71 is coupled in series with the resonant capacitor $C_R$. The secondary side of the transformer T71 is coupled in parallel with a resistor R71. Accordingly, the voltage across resistor R71 is proportional to the resonant current $I_{RES}$. The voltage across resistor R71 operates the current source I51, which charges capacitor C51 as described above.

Figure 8:
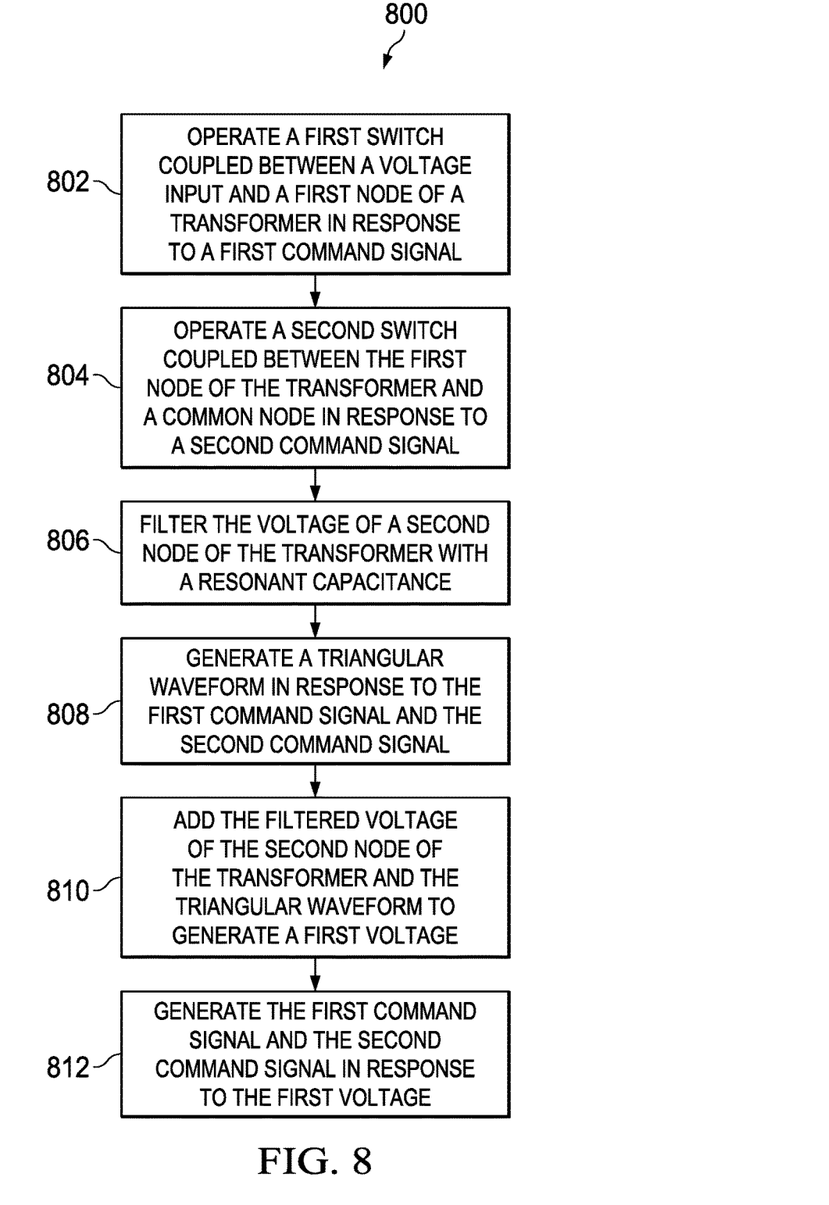
FIG. 8 is a flowchart describing the operation of an LLC converter.

FIG. 8 is a flowchart 800 describing a method of operating an LLC converter, such as those LLC converters described above. The method includes operating a first switch coupled between a voltage input and a first node of a transformer in response to a first command signal at step 802. Step 804 includes operating a second switch coupled between the first node of the transformer and a common node in response to a second command signal. Step 806 includes filtering the voltage of a second node of the transformer with a resonant capacitance. Step 808 includes generating a triangular waveform in response to the first command signal and the second command signal. Step 810 includes adding the filtered voltage of the second node of the transformer and the triangular waveform to generate a first voltage. Step 812 includes generating the first command signal and the second command signal in response to the first voltage.

LLC converters have been described above. The inventive concepts further pertain to the controllers for the LLC converters. Such controllers may be consist of the components described above except for the transformers and the switches that control current through the transformers.

Although illustrative embodiments have been shown and described by way of example, a wide range of alternative embodiments is possible within the scope of the foregoing disclosure.

What is claimed is:
1. An LLC converter comprising:
an input having a first node and a second node;
a first switch coupled between the first node and a third node;
a second switch coupled between the third node and the second node;
a transformer having a first transformer input coupled to the third node;
a resonant capacitor coupled to a second transformer input and to a first input of a summer;
a voltage ramp generator coupled to a second input of the summer, the summer for summing voltages at the first input and the second input; and
circuitry for generating control signals for the first switch and the second switch in response to the output of the summer, wherein the ramp generator and the summer include:
a capacitive divider coupled to the resonant capacitor, the capacitive divider having an output node;
a first current source coupled between a voltage source and the output node, the first current source injecting current into the output node in response to the control signal for the first switch; and
a second current source coupled between the output node and a common node, the second current source drawing current from the output node in response to the control signal for the second switch.
2. The LLC converter of claim 1, wherein:
the voltage ramp generator generates a positive slope segment of a triangular wave in response to the control signal generating a signal to close the first switch;
the voltage ramp generator generates a negative slope segment of the triangular wave in response to the control signal generating a signal to close the second switch; and
the positive and negative slopes have the same magnitudes.

3. The LLC converter of claim 2, wherein the voltage ramp generator generates the triangular wave centered about a common voltage.

4. The LLC converter of claim 1, wherein the transformer has a secondary side and wherein the circuitry for generating control signals for the first switch and the second switch at least partially generates the controls signals in response to an output of the secondary side of the transformer.

5. The LLC converter of claim 1, wherein the voltage source generates a voltage that is at least twice the common mode voltage.

6. The LLC converter of claim 1, wherein current generated by the first current source is equal to current generated by the second current source.

7. The LLC converter of claim 1, wherein the circuitry for generating control signals for the first switch and the second switch in response to the output of the summer comprises:
circuitry for generating a high threshold voltage and a low threshold voltage in response to comparing an output of the transformer with the common mode voltage of the triangular waveform;
circuitry for generating the first command signal by comparing the high threshold voltage to the first voltage; and
circuitry for generating the second command signal by comparing the low threshold voltage to the first voltage.

8. An LLC converter comprising:
an input having a first node and a second node;
a first switch coupled between the first node and a third node;
a second switch coupled between the third node and the second node;
a transformer having a first transformer input coupled to the third node;
a resonant capacitor coupled to a second transformer input and to a first input of a summer;
a voltage ramp generator coupled to a second input of the summer, the summer for summing voltages at the first input and the second input; and
circuitry for generating control signals for the first switch and the second switch in response to the output of the summer, wherein the ramp generator and the summer include:
a resonant current sensor coupled to the second transformer input;
a first current source coupled to an output node, the first current source generating current in response to an output of the resonant current sensor;
a capacitor coupled between the output node and a common node;
a second current source coupled between a voltage source and the output node, the second current source for injecting current into the output node in response to the control signal for the first switch; and
a third current source coupled between the output node and a common node, the third current source drawing current from the output node in response to the control signal for the second switch.

9. The LLC converter of claim 8, wherein the voltage source generates a voltage that is twice the common mode voltage.

10. The LLC converter of claim 8, wherein current generated by the second current source is equal to current generated by the third current source.

11. The LLC converter of claim 8, wherein the current sensor is a voltage differentiator coupled to the resonant capacitor.

12. The LLC converter of claim 8, wherein the current sensor is a current sensing transformer coupled in series with the resonant capacitor.

13. A method of operating an LLC converter, the method comprising:
operating a first switch coupled between a voltage input and a first node of a transformer in response to a first command signal;
operating a second switch coupled between the first node of the transformer and a common node in response to a second command signal;
filtering the voltage of a second node of the transformer with a resonant capacitance;
generating a triangular waveform in response to the first command signal and the second command signal;
adding the filtered voltage of the second node of the transformer and the triangular waveform to generate a first voltage; and
generating the first command signal and the second command signal in response to the first voltage, wherein generating a triangular waveform in response to the first command signal and the second command signal and adding the filtered voltage of the second node of the transformer and the triangular waveform to generate a first voltage comprises:
driving a first current into an output node of a capacitive divider in response to the first command signal, the capacitive divider being coupled to the resonant capacitor, the first voltage being on the output node of the capacitive divider; and
driving a second current from the output node of a capacitive divider in response to the second command signal.

14. The method of claim 13, wherein generating a triangular waveform comprises:
generating a positive slope segment of the triangular waveform when the first command signal indicates closing the first switch; and
generating a negative slope segment of the triangular waveform when the second command indicates closing the second switch.

15. The method of claim 13, wherein generating the first command signal and the second command signal comprises generating the first command signal and the second command signal in response to the first voltage and an output voltage generated by the transformer.

16. The method of claim 13, wherein the magnitude of the first current and the magnitude of the second current are equal and constant.

17. The method of claim 13, wherein generating the first command signal and the second command signal in response to the first voltage comprises:
generating a high threshold voltage and a low threshold voltage in response to comparing an output of the transformer with the common mode voltage of the triangular waveform;
circuitry for generating the first command signal by comparing the high threshold voltage to the first voltage; and
circuitry for generating the second command signal by comparing the low threshold voltage to the first voltage.

18. An LLC converter comprising:
an input having a first node and a second node;

a first switch coupled between the first node and a third node;

a second switch coupled between the third node and the second node;

a transformer having a first transformer input coupled to the third node;

a resonant capacitor coupled to a second transformer input;

scaling and level shifting circuitry coupled between the second transformer input and a first input of a summer;

a voltage ramp generator coupled to a second input of the summer, the summer for summing voltages at the first input and the second input, wherein the voltage ramp generator generates a positive slope segment of the triangular wave in response to the control signal generating a signal to close the first switch, the voltage ramp generator generates a negative slope segment of the triangular wave in response to the control signal generating a signal to close the second switch, and the positive and negative slopes have the same magnitudes; and circuitry for generating control signals for the first switch and the second switch at least partially in response to the output of the summer and an output of the secondary side of the transformer, wherein the ramp generator and the summer include:

a capacitive divider coupled to the resonant capacitor, the capacitive divider having an output node:

a first current source coupled between a voltage source and the output node, the first current source injecting current into the output node in response to the control signal for the first switch; and a second current source coupled between the output node and a common node, the second current source drawing current from the output node in response to the control signal for the second switch.

19. A controller for an LLC converter, the controller comprising:

a first input for coupling the LLC converter to a first node of a transformer, wherein a resonant capacitor is couplable to the first node of the transformer;

outputs for coupling the LLC controller to at least one switch wherein the at least one switch is for controlling the current through the transformer by way of coupling to a second node of the transformer, a summer having a first input and a second input, wherein the first input is for coupling to the first node of the transformer, the summer for summing the voltages at the first input and the second input;

a voltage ramp generator coupled to the second input of the summer; and circuitry for generating control signals for the at least one switch in response to the output of the summer, wherein the ramp generator and the summer include:

a capacitive divider coupled to the resonant capacitor, the capacitive divider having an output node;

a first current source coupled between a voltage source and the output node, the first current source injecting current into the output node in response to the control signal for the first switch; and a second current source coupled between the output node and a common node, the second current source drawing current from the output node in response to the control signal for the second switch.

* * * * *